(12) United States Patent
Kim

(10) Patent No.: US 10,678,408 B2
(45) Date of Patent: Jun. 9, 2020

(54) DISPLAY APPARATUS AND METHOD OF HIGHLIGHTING OBJECT ON IMAGE DISPLAYED BY A DISPLAY APPARATUS

(71) Applicant: SAMSUNG ELECTRONICS CO., LTD., Suwon-si (KR)

(72) Inventor: Kook-heon Kim, Anyang-si (KR)

(73) Assignee: SAMSUNG ELECTRONICS CO., LTD., Sunwon-si (KR)

( * ) Notice: Subject to any disclaimer, the term of this patent is extended or adjusted under 35 U.S.C. 154(b) by 281 days.

(21) Appl. No.: 14/705,402

(22) Filed: May 6, 2015

(65) Prior Publication Data

US 2015/0324092 A1    Nov. 12, 2015

(30) Foreign Application Priority Data

May 7, 2014    (KR) .................. 10-2014-0054256

(51) Int. Cl.
*G06F 3/0484*    (2013.01)
*G06F 3/0481*    (2013.01)
*G06F 3/0488*    (2013.01)
*G06F 3/0489*    (2013.01)
*G06F 3/0482*    (2013.01)

(52) U.S. Cl.
CPC ........ *G06F 3/04842* (2013.01); *G06F 3/0481* (2013.01); *G06F 3/0482* (2013.01); *G06F 3/0488* (2013.01); *G06F 3/04892* (2013.01)

(58) Field of Classification Search
None
See application file for complete search history.

(56) References Cited

U.S. PATENT DOCUMENTS

| | | | |
|---|---|---|---|
| 7,555,725 B2 * | 6/2009 | Abramson | G01C 21/367 715/781 |
| 8,281,258 B1 | 10/2012 | Dixon et al. | |
| 8,533,627 B2 | 9/2013 | Kim et al. | |
| 2003/0140033 A1 * | 7/2003 | Iizuka | G06F 17/30595 |

(Continued)

FOREIGN PATENT DOCUMENTS

| | | |
|---|---|---|
| EP | 2328071 A1 | 6/2011 |
| JP | 2011-034467 A | 2/2011 |

(Continued)

OTHER PUBLICATIONS

Communication dated Aug. 18, 2015 issued by European Patent Office in counterpart European Patent Application No. 15 166 440.6.

(Continued)

*Primary Examiner* — Toan H Vu
(74) *Attorney, Agent, or Firm* — Sughrue Mion, PLLC

(57) ABSTRACT

A display apparatus which includes a display configured to display an image including a plurality of objects; a user interface configured to receive an input of a highlight moving key in order to move a highlight from a first object to a target object positioned in a direction associated with the highlight moving key; and a controller configured to determine the target object satisfying a predetermined condition as the target object among the plurality of objects biased from the first object toward the direction desired by the user in accordance with the input of the highlight moving key, and move the highlight of the first object to the target object.

29 Claims, 11 Drawing Sheets

(56) References Cited

U.S. PATENT DOCUMENTS

| | | | | |
|---|---|---|---|---|
| 2004/0135823 | A1* | 7/2004 | Wingett | G06F 3/0236 715/856 |
| 2004/0155909 | A1* | 8/2004 | Wagner | G06F 3/04817 715/854 |
| 2008/0098331 | A1* | 4/2008 | Novick | G06F 3/0233 715/835 |
| 2008/0109753 | A1* | 5/2008 | Karstens | G06F 9/4443 715/802 |
| 2008/0122796 | A1* | 5/2008 | Jobs | G06F 3/0488 345/173 |
| 2008/0222530 | A1 | 9/2008 | Lakshmanan et al. | |
| 2009/0169060 | A1* | 7/2009 | Faenger | G09B 29/007 382/113 |
| 2009/0303204 | A1* | 12/2009 | Nasiri | A63F 13/06 345/184 |
| 2010/0124382 | A1* | 5/2010 | Choi | H04N 5/2622 382/256 |
| 2010/0229125 | A1 | 9/2010 | Cha | |
| 2011/0093819 | A1* | 4/2011 | Irvine | G06F 3/038 715/856 |
| 2011/0126147 | A1 | 5/2011 | Kim et al. | |
| 2011/0270876 | A1* | 11/2011 | Gill | G06F 16/33 707/769 |
| 2011/0295773 | A1* | 12/2011 | Fisher | G06F 17/30994 706/11 |
| 2012/0023447 | A1* | 1/2012 | Hoshino | G06F 17/2735 715/823 |
| 2012/0089944 | A1 | 4/2012 | Kim et al. | |
| 2012/0110509 | A1* | 5/2012 | Isozu | G06F 3/0482 715/830 |
| 2012/0131518 | A1* | 5/2012 | Lee | G06F 3/011 715/863 |
| 2013/0145320 | A1* | 6/2013 | Oosterholt | G06F 3/04812 715/823 |
| 2013/0246955 | A1* | 9/2013 | Schwesig | G06F 3/017 715/767 |
| 2013/0254719 | A1* | 9/2013 | Hanazaki | G06F 3/04817 715/846 |
| 2014/0181750 | A1* | 6/2014 | Fujiwara | G06F 3/04817 715/835 |
| 2014/0210714 | A1* | 7/2014 | Kang | G06F 3/0481 345/158 |
| 2014/0215398 | A1* | 7/2014 | Fleizach | G06F 3/0487 715/823 |
| 2014/0317555 | A1* | 10/2014 | Choi | G06F 3/04817 715/781 |

FOREIGN PATENT DOCUMENTS

| | | |
|---|---|---|
| KR | 1020100101389 A | 9/2010 |
| KR | 1020110055962 A | 5/2011 |
| KR | 1020120036017 A | 4/2012 |

OTHER PUBLICATIONS

Communication dated Nov. 25, 2015, issued by the Korean Intellectual Property Office in counterpart Korean Application No. 10-2014-0054256.

Communication dated Jan. 26, 2016, issued by the Korean Intellectual Property Office in counterpart Korean Application No. 10-2014-0054256.

Communication from the Korean Intellectual Property Office dated Apr. 29, 2015 in a counterpart Korean application No. 10-2014-0054256, 12 pages in Korean and English.

Communication from the European Patent Office dated Jul. 15, 2105 in a counterpart European Application No. 15166440.6. 3 pages.

Communication dated Jul. 25, 2017 by the European Patent Office in counterpart European Application No. 15166440.6.

* cited by examiner

DISPLAY APPARATUS AND METHOD OF HIGHLIGHTING OBJECT ON IMAGE DISPLAYED BY A DISPLAY APPARATUS

CROSS-REFERENCE TO RELATED APPLICATION

This application claims priority from Korean Patent Application No. 10-2014-0054256, filed on May 7, 2014 in the Korean Intellectual Property Office, the disclosure of which is incorporated herein by reference in its entirety.

BACKGROUND

1. Field

Apparatuses and methods consistent with exemplary embodiments relate to highlighting an object within an image displayed by a display apparatus, and determining movement of a highlight based on a relative position between objects on a screen by receiving a user's input through arrow keys and a selection key in a display apparatus.

2. Description of the Related Art

Smart phones, smart televisions (TVs) and other similar devices supporting a downloadable application have become popular. However, if an application has to be implemented in a TV or other display apparatuses that do not include a touch pad or a pointing device or are used by a user who is familiar with conventional keys, a developer of the application still needs to make a highlight capable of being moved by arrow keys and a selection button.

Further, applications have mostly been developed based on using devices capable of directly inputting a pointing position such as a mouse, a touch panel, etc. It may be necessary for the highlight to be moved by arrow keys in a display apparatus that cannot use a mouse or a touch panel, etc.

Thus, applications have been programmed to support arrow keys and a selection key. Therefore, an arrow key input can mark a current object with a highlight as well as determine where to move the highlight next, separately from movement and selection of a mouse.

Further, movement of the highlight based on the movement of the mouse should be synchronized with that based on the arrow key input.

In addition, when there is an arrow key input, each of the applications may have to individually determine what object is currently highlighted on a screen, and select which different object will be highlighted depending on which direction key is input.

Further, when the input device is switched from the arrow keys to the pointing device or from the pointing device to the arrow keys, it may be awkward since state information about which object is highlighted has to be continuously managed.

SUMMARY

According to an aspect of an exemplary embodiment, there is provided a method of receiving information about boundary patterns of objects that constitute a screen, determining a position of an object of each screen in accordance with directions of an arrow key input by a user, and moving a highlight to an object positioned in the corresponding direction, and a display apparatus employing the same method.

According to an aspect of another exemplary embodiment, there is provided a method of highlighting an object, which can be used for not only an application previously developed to support a pointing device but also an application supporting an input key as a main input device, and a display apparatus employing the same method.

According to an aspect of an exemplary embodiment, there is provided a display apparatus including a display configured to display an image comprising a plurality of objects; a user interface configured to receive an input of a highlight moving key in order to move a highlight from a first object among the plurality of objects in a direction associated with the highlight moving key to a target object among the plurality of objects; and a controller configured to: determine the target object that satisfies a predetermined condition as the target object among the plurality of objects biased from the first object toward the direction associated with the highlight moving key, and move the highlight from the first object to the target object.

The plurality of objects within the image may be bounded by a boundary pattern having a predetermined shape.

The predetermined shape may be a rectangle.

The controller may be further configured to: if a horizontal axis extended from a vertex of a rectangular screen in a horizontal direction is an X-axis and a vertical axis extended in a vertical direction is a Y-axis, define the rectangular boundary pattern by a first line parallel to the X-axis extending across a minimum point in a Y-axis direction from the X-axis to the object, a second line parallel to the X-axis extending across a maximum point in the Y-axis direction from the X-axis to the object, a third line parallel to the Y-axis extending across a minimum point in a X-axis direction from the Y-axis to the object, and a fourth line parallel to the Y-axis extending across a maximum point in the X-axis direction from the Y-axis to the object.

The controller may be further configured to determine an effective object of the plurality of objects biased toward the direction associated with the highlight moving key according to: if the direction is a left direction, the object is the effective object when $RectN.r < RectF.r$ and $RectN.l < RectF.l$; if the direction is a right direction, the object is the effective object when $RectF.l < RectN.l$ and $RectF.r < Rect.r$; if the direction is an up direction, the object is the effective object when $RectN.d < RectF.d$ and $RectN.u < RectF.u$; and if the direction is a down direction, the object is the effective object when $RectF.u < RectN.u$ and $RectF.d < Rect.d$, wherein $RectN.u$, $RectN.d$, $RectN.l$ and $RectN.r$ respectively refer to the up, down, left and right sides of a boundary pattern $RectN$ of a target object $Obj$, and $RectF.u$, $RectF.d$, $RectF.l$ and $RectF.r$ respectively refer to the up, down, left and right sides of a boundary pattern $RectF$ of an object curSel currently marked with the highlight.

The predetermined condition may include a comparison of a value L and a value D of the target object Obj, wherein the value L is a length of overlapping in a direction between the boundary pattern RectF of the object curSel currently marked with the highlight and the boundary pattern RectN of the target object Obj, and the value D is a shortest distance between an extended line from one side of the boundary pattern RectF of the object curSel currently marked with the highlight and a corresponding side of the target object Obj.

The controller may be further configured to determine the target object that has at least a nonzero value L and the smallest value D among the target objects is the effective object, based on the comparison results.

If there are two or more objects having the smallest value D, the controller may be configured to determine that the target object that has the largest value L is the effective object.

If there are two or more objects having the smallest value D and the largest value L, the controller may be further configured to determine that the target object that has a minimum distance K from a center of the boundary pattern of the first object to centers of the boundary patterns of the respective target objects is the effective object.

If there is no object overlapped in the direction between the boundary pattern RectF of the object curSel currently marked with the highlight and the boundary pattern RectN of the target object Obj, the controller may be configured to determine that the target object that has a minimum distance R from a center of the boundary pattern of the first object to closest vertexes of the boundary patterns of the respective target objects, among the objects biased toward the predetermined direction is the effective object.

When the highlight moving key is input, the controller may be further configured to apply the input of the highlight moving key to objects of an image frame next to the image frame displayed on the display.

The display apparatus may include a memory configured to store a next image frame.

The highlight may be marked on the boundary pattern of the object.

The user input receiver may include at least one of a remote controller, a keyboard, a joystick, and a joy pad.

According to an aspect of another exemplary embodiment, there is provided a method of highlighting an object within an image displayed on a display apparatus, the method including displaying an image comprising a plurality of objects; receiving an input of a highlight moving key in order to move a highlight from a first object among the plurality of objects in a direction associated with the highlight moving key to a target object among the plurality of objects; and determining the target object that satisfies a predetermined condition as the target object among the plurality of objects biased from the first object toward the direction associated with the highlight moving key, and moving the highlight from the first object to the target object.

The plurality of objects within the image may be bounded by a boundary pattern having a predetermined shape.

The predetermined shape may be a rectangle.

If a horizontal axis extended from a vertex of a rectangular screen in a horizontal direction is an X-axis and a vertical axis extended in a vertical direction is a Y-axis, defining the rectangular boundary pattern by a first line parallel to the X-axis extending across a minimum point in a Y-axis direction from the X-axis to the object, a second line parallel to the X-axis extending across a maximum point in the Y-axis direction from the X-axis to the object, a third line parallel to the Y-axis extending across a minimum point in a X-axis direction from the Y-axis to the object, and a fourth line parallel to the Y-axis extending across a maximum point in the X-axis direction from the Y-axis to the object.

The method may further include determining an effective object of the plurality of objects biased toward the direction associated with the highlight moving key according to: if the direction is a left direction, the object is the effective object when RectN.r<RectF.r and RectN.l<RectF.l; if the direction is a right direction, the object is the effective object when RectF.l<RectN.l and RectF.r<Rect.r; if the direction is an up direction, the object is the effective object when RectN.d<RectF.d and RectN.u<RectF.u; and if the direction is a down direction, the object is the effective object when RectF.u<RectN.u and RectF.d<Rect.d, wherein RectN.u, RectF.d, RectN.l and RectN.r respectively refer to the up, down, left and right sides of a boundary pattern RectN of a target object Obi, and RectF.u, RectF.d, RectF.l and RectF.r respectively refer to the up, down, left and right sides of a boundary pattern RectF of an object curSel currently marked with the highlight.

The predetermined condition may include a comparison of a value L and a value D of the target object Obj, wherein the value L is the length of overlapping in a direction between the boundary pattern RectF of the object curSel currently marked with the highlight the boundary pattern RectN of the target object Obj, and the value D is a shortest distance between an extended line from one side of the boundary pattern RectF of the object curSel currently marked with the highlight and a corresponding side of the target object Obj.

The determining the effective object may include determining the target object that has at least a nonzero value L and the smallest value D among the target objects as the effective object.

If there are two or more objects having the smallest value D, the determining the effective object may include determining the target object that has the largest value L, as the effective object.

If there are two or more objects having the smallest value D and the largest value L, determining that the target object that has a minimum distance K from a center of the boundary pattern of the first object to centers of the boundary patterns of the respective target objects is the effective object.

If there is no object overlapped in between the boundary pattern RectF of the object curSel currently marked with the highlight and the boundary pattern RectN of the target object Obj, the determining the second object may include determining that the target object that has a minimum distance R from a center of the boundary pattern of the first object to closest vertexes of the boundary patterns of the respective target objects, among the objects biased toward the predetermined direction is the effective object.

When the highlight moving key is input, the determining the second object may include applying the input of the highlight moving key to objects of an image frame next to the image frame displayed on the display.

The method may further include storing a next image frame.

The highlight may be marked on the boundary pattern of the object.

The input of a highlight moving key may be received through at least one of a remote controller, a keyboard, a joystick, and a joy pad.

According to an aspect of another exemplary embodiment, there is provided a method of manipulating a highlight displayed on a display, the method including a plurality of objects on the display, wherein at least one of the plurality of objects is highlighted; receiving an input selecting a position on the display of a target object among the plurality of objects; comparing a position of the highlighted at lest one of the plurality of objects with the positions of each of the plurality of objects; determining a next highlighted object according to the position of the highlighted at least one of the plurality of objects, the position of the target object, and the positions of the objects on the display based on the result of the comparing; and moving the highlight from the highlighted at least one of the plurality of objects to the next highlighted object.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. The following exemplary embodiments describe only some configurations related to inventive concepts, and descriptions of other configurations may be omitted. However, it will be understood that some omitted configurations may be useful in realizing an apparatus or system to which inventive concepts are applied. Further, like numerals refer to like elements throughout.

Figure 1:
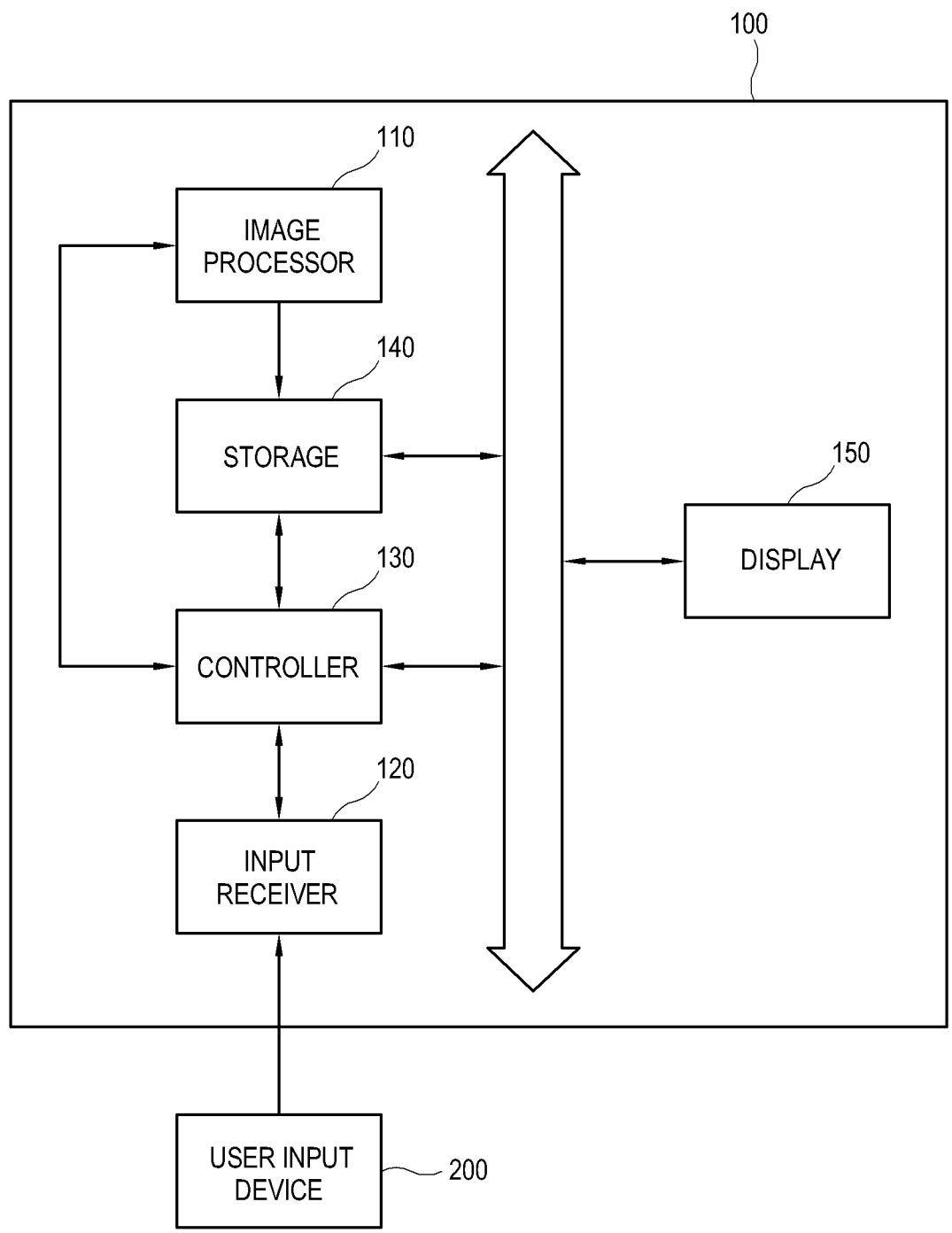
FIG. 1 is a block diagram illustrating a display apparatus according to an exemplary embodiment.

FIG. 1 is a block diagram illustrating a display apparatus 100 according to an exemplary embodiment. As shown in FIG. 1, the display apparatus 100 may include an image processor 110 for processing an image, a controller 130, a storage 140, an input receiver 120, and a display 150. Besides the foregoing elements, the display apparatus 100 may further include many elements such as an image receiver including a tuner, a wired/wireless communicator, a timing controller, a voice processor, etc.

The image processor 110 may perform a variety of preset image processing for displaying image data received from the exterior or stored image data. For example, the image processing may include scaling for enlarging or reducing a screen in accordance with a given resolution, decoding and encoding corresponding to various image formats, de-interlacing, frame rate conversion, refresh rate conversion, noise reduction for improving image quality, detail enhancement, line scanning, etc. The processor may be implemented individually or as part of a complex system.

The image data processed in the image processor 110 may include a plurality of image frames, and each image frame may include at least one object. The objects of each image frame may be elements of a screen implemented in an application and may be highlighted.

The input receiver 120 may receive a user command from a user input device 200. The user input device may be an external device. The user command may include a user command for moving a highlight between objects or selecting an object to be highlighted. The command for moving a highlight among the objects and selecting an object to be highlighted may be input through arrow keys, i.e., up, down, left and right keys and a selection (or enter) key. The user input device 200 may include a remote controller, a keyboard, a joystick, a joy pad, or the like that includes the up, down, left and right keys and the selection (or enter) key.

The controller 130 may control the elements of the display apparatus 100, for example, the image processor 110, the storage 140, the input receiver 120 and the display 150.

The controller 130 may move a highlight among objects of an image frame processed in the image processor 110 in accordance with a user key input received through the input receiver 120 for moving the highlight among the objects 102. A process of moving a highlight from a currently selected object to another object among a plurality of objects positioned in an input moving direction will be described.

The controller 130 may include application specific integrated circuits (ASICs), digital signal processors (DSPs), digital signal processing devices (DSPDs), programmable logic devices (PLDs), field programmable gate arrays (FPGAs), microcontrollers, and microprocessors.

The storage 140 may, for example, include a frame buffer for temporarily storing image data processed by the image processor 110 in units of frame to be displayed on the display 150. The storage 140 may include a random access memory (RAM) for storing key code data converted from an input key received from the input receiver 120. Besides the foregoing image data, the storage 140 may include various pieces of information such as various pieces of data, various programs, operating system (OS), etc.

The storage 140 may include at least one type of storage medium among a flash memory type, a hard disk type, a multimedia card micro type, a card type memory (e.g., SD or XD memory, etc.), a random access memory (RAM), a static random access memory, a read-only memory (ROM), electrically erasable programmable read-only memory (EEPROM), a programmable read-only memory (PROM), a magnetic memory, a magnetic disk, and an optical disc.

The display 150 may display an image based on an image signal. The display 150 may be achieved with a liquid crystal panel with a liquid crystal layer, an organic light emitting diode (OLED) panel with an organic light emitting layer, a plasma display panel, etc.

The display 150 may include additional elements in accordance with its panel types. For example, if the display 150 is achieved by a liquid crystal panel, it may further include a backlight and may additionally include a prism film, a polarization film, a liquid crystal display (LCD) cell, a color filter, etc., in accordance with a polarization characteristic and a condensing characteristic of illumination light.

Below, a display method of highlighting an object 102 that is an element of an image frame will be described according to an exemplary embodiment.

Figure 2:
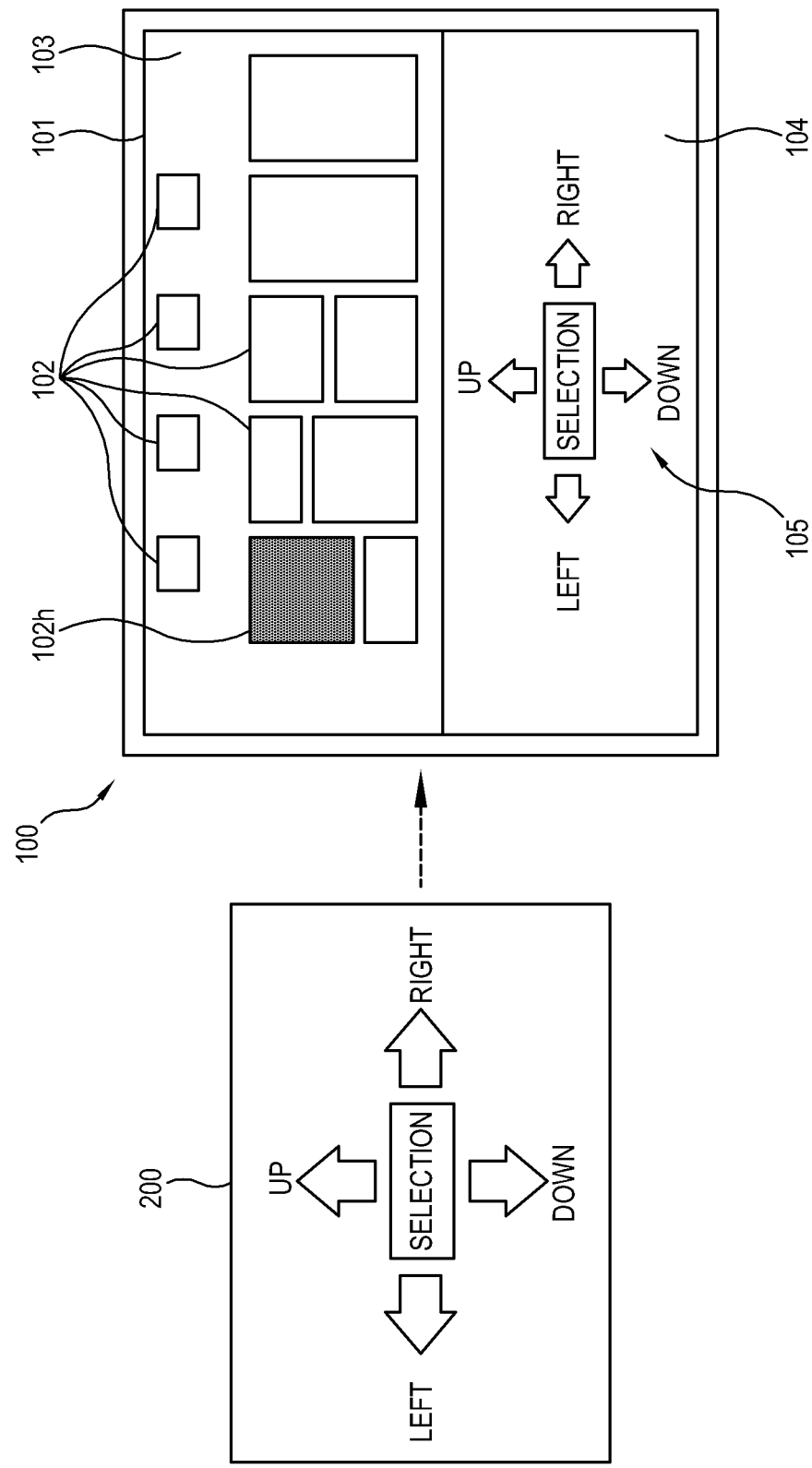
FIG. 2 illustrates objects and a highlight on an image of the display apparatus in accordance with control of arrow keys.

FIG. 2 is a view showing a screen 101 displaying an image frame of an application in the display apparatus 100 according to an exemplary embodiment.

The screen 101 includes a display area 103 for displaying a plurality of objects 102 and 102*h* that constitute an image, and a control area 104 for moving and selecting the object. As shown in FIG. 2, the objects 102 and 102*h* displayed on the display area 103 may be represented as rectangular boxes, and the highlight may be represented as shade on the object 102*h*. Further, the highlight may be marked as shade corresponding to an actual shape of the object or as shade on a boundary pattern (to be described later). The user may move the highlight marked on the object 102*h* to one of other objects 102 through the up, down, left and right arrow keys of the external user input device 200, or may execute a function, e.g., a hypertext, by selecting the object 102*h* currently marked with the highlight. Further, a user may use the arrow keys and a selection interface 105 provided in the control area 104 through a mouse or a touch input.

According to an exemplary embodiment, the objects 102 and 102*h* may include a rectangular boundary pattern formed with respect to a certain reference. As shown in FIG.

3, the boundary pattern may be formed with respect to a certain object, e.g., an object Bobj of a car, is formed as follows. The description for making the boundary pattern set forth herein is merely exemplary and is not limited thereto. Alternatively, the boundary pattern may be formed in various shapes such as a circle, a triangle, etc.

Figure 3:
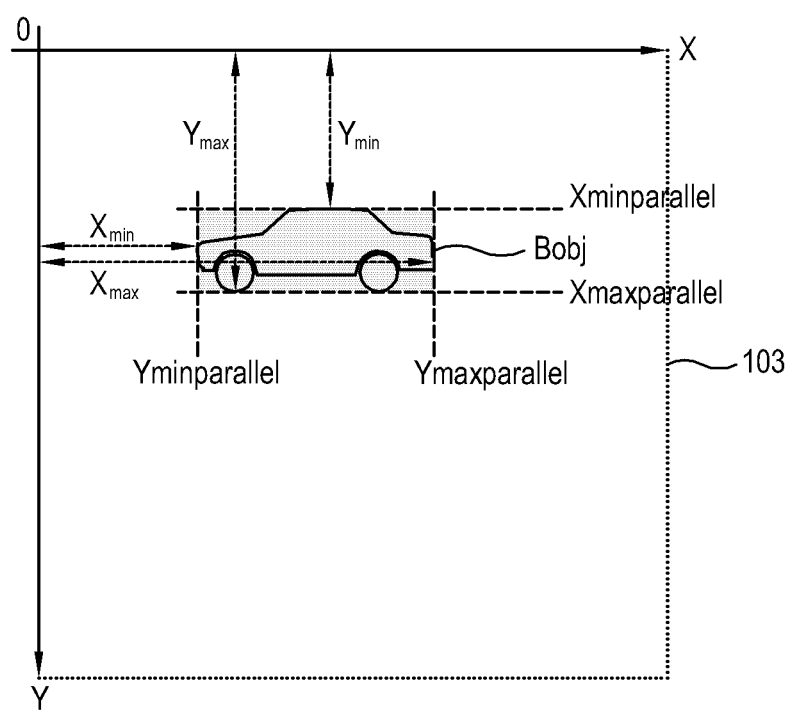
FIG. 3 illustrates a method of setting a boundary pattern for an object according to an exemplary embodiment.

According to an exemplary embodiment, as shown in FIG. 3, suppose that a display area 103 has a rectangular shape. Let a left upper vertex of the display area 103 be regarded as an origin, an abscissa be an X-axis and an ordinate be a Y-axis. Alternatively, another vertex of the display area 103 may be set as the origin.

The shortest distance from the X-axis and the Y-axis to the car Bobj may be expressed by various values in accordance with the shape of the car Bobj. The shortest distance includes the minimum point (Xmin),(Ymin) in which the shortest distance has the minimum value, and the maximum point (Xmax),(Ymax) in which the shortest distance has the maximum value.

The rectangular boundary pattern of the car Bobj may be determined as a rectangle (i.e., a shade portion) formed by two lines parallel to the X-axis (Xminparallel)(Xmaxparallel), respectively going across the minimum point (Ymin) and the maximum point (Ymax), and two lines parallel to the Y-axis (Yminparallel)(Ymaxparallel), respectively going across the minimum point (Xmin) and the maximum point (Xmax) as shown in FIG. 3.

Figure 4:
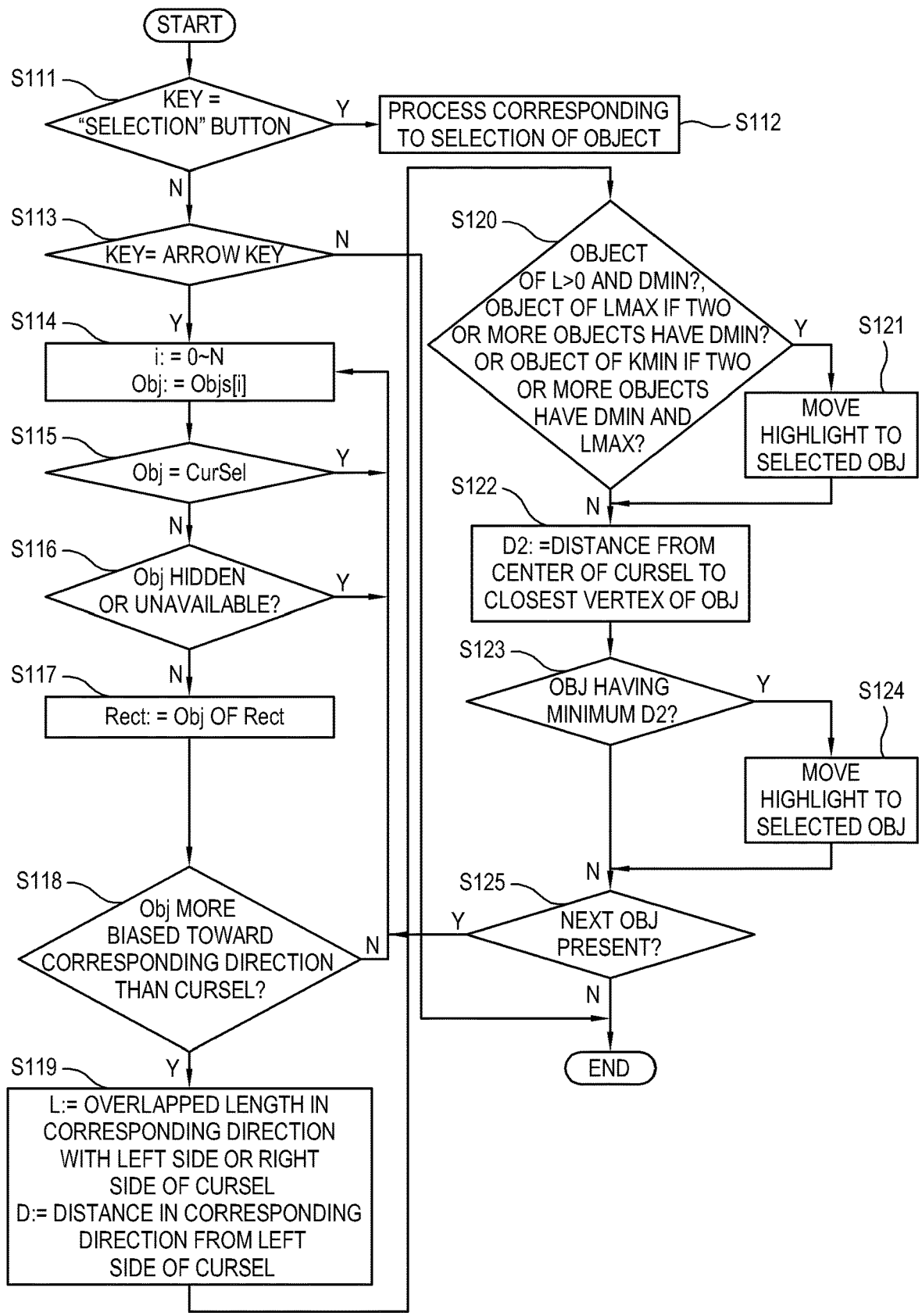
FIG. 4 is a flowchart illustrating a method of moving a highlight between objects within an image according to an exemplary embodiment.

Below, a display method of highlighting the object 102 within the image will be described with reference to FIG. 4.

When a user inputs any of four arrow keys or the selection key to the input receiver 120 of the display apparatus 100 through a remote controller 200 or another input device, the controller 130 converts the input key into a key code and stores the key code in the storage (e.g., a RAM). The direction of the arrow is defined as one of the up, down, left and right directions.

At operation S111, it is determined whether the corresponding key code is the "selection key."

If it is determined in operation S111 that the key code is the selection key, then at operation S112, the corresponding input is determined to be that the user wants to select an object currently marked with a highlight in an image frame on a display area. Thus, a "selection" event is generated by an application to perform a process corresponding to the selection of the object.

If it is determined in operation S111 that the key code is not the selection key, then at operation S113 it is determined whether the key code is the arrow key. If the corresponding key code is not the "arrow key," the process is terminated.

If the corresponding key code is the "arrow key", a boundary pattern of an object currently marked with a highlight is designated as "RectF." The boundary pattern has information about left, top, width, height, right, bottom, center_x, and center_y coordinates.

To select an object to which the highlight will move, the controller 130 sequentially applies the following rules with regard to objects input from an application.

At operation S114, one object is selected among the plurality of objects Objs input from the application.

At operation S115, it is determined whether the selected object Obj is the object, CurSel, currently marked with the highlight. If it is determined that the selected object Obj is the object, CurSel, currently marked with the highlight, the controller 130 returns to the operation S114 and selects the next object. On the other hand, if it is determined that the selected object Obj is not the object CurSel currently marked with the highlight, the controller 130 enters the next operation S116.

At operation S116, it is determined whether the selected object is not seen on the screen, i.e., hidden, or unavailable. If it is determined that the selected object is not seen on the screen or unavailable, the controller 130 returns to the operation S114 and selects the next object. If the selected object is seen on the screen and available, the controller 130 enters the next operation S117.

At operation S117, a boundary pattern is determined with respect to the selected object Obj. At this time, the determined boundary pattern is called "RectN."

At operation S118, it is determined whether the currently selected object Obj is more biased toward the corresponding direction, i.e., the input direction of the arrow key, than the object, CurSel, currently marked with the highlight. The effective object (i.e., the more biased object) of the objects biased toward the corresponding direction is determined as follows.

In the below discussion, RectN.u, RectN.d, RectN.l and RectN.r respectively refer to the up, down, left and right sides of the boundary pattern RectN of a target object Obj. Further, RectF.u, RectF.d, RectF.l and RectF.r respectively refers to the up, down, left and right sides of the boundary pattern RectF of the object, CurSel, currently marked with the highlight. The left and right sides of the boundary pattern RectF of the object CurSel currently marked with the highlight are set to the left and right directions with respect to the X-axis, and the up and down sides are set to the up and down directions with respect to the Y-axis.

If the corresponding direction is the left direction, the object is effective when RectN.r<RectF.r and RectN.l<RectF.l.

If the corresponding direction is the right direction, the object is effective when RectF.l<RectN.l and RectF.r<Rect.r.

If the corresponding direction is the up direction, the object is effective when RectN.b<RectF.b and RectN.u<RectF.u.

If the corresponding direction is the down direction, the object is effective when RectF.u<RectN.u and RectF.d<RectN.d.

Figure 5:
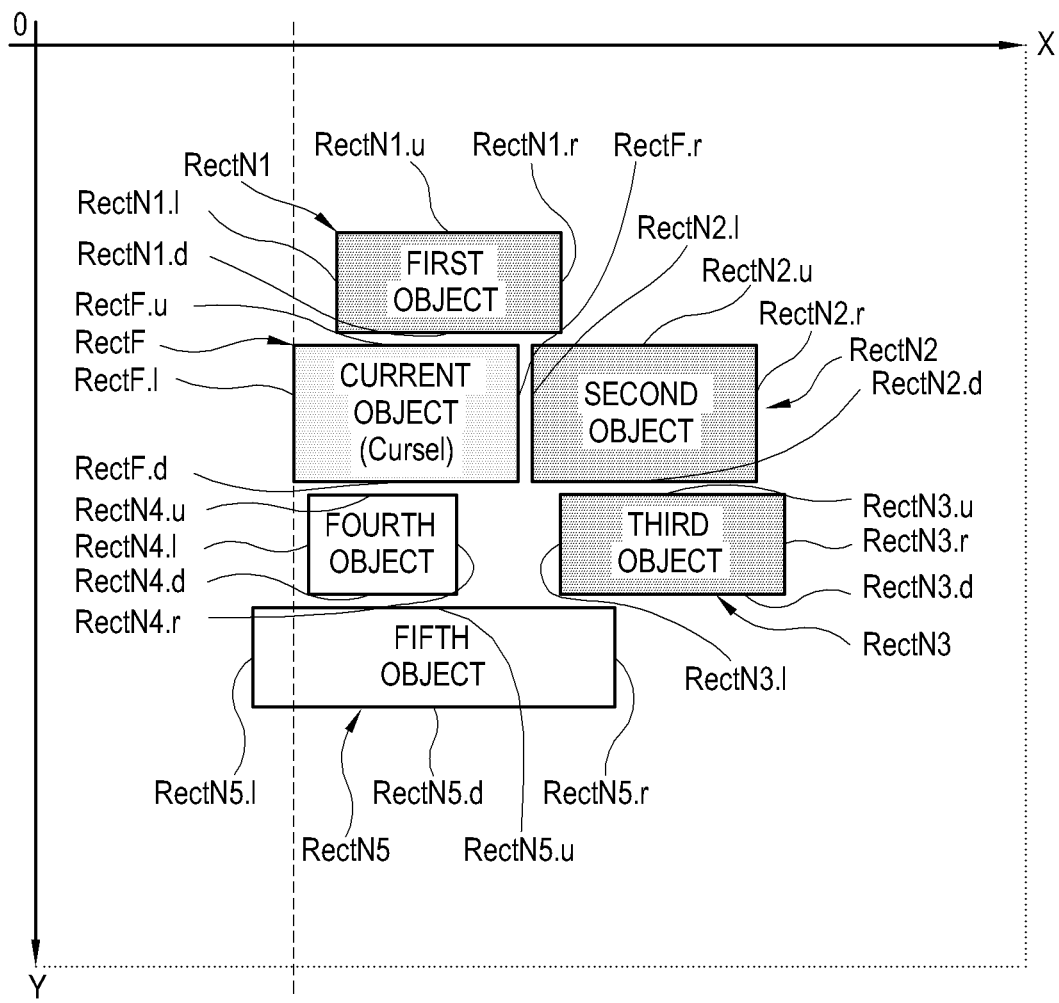
FIGS. 5 to 11 are views illustrating determination of the object to which a highlight will move according to an exemplary embodiment.

FIG. 5 is a view for explaining a method of determining right objects among all the objects 1 to 5 when an input of a right direction is received with regard to an object, CurSel, currently marked with the highlight.

As shown in FIG. 5, the method of determining the objects biased in the right direction is effective as described above when the left side RectN(i).l of the selected object RectN(i) is placed to the right of the left side RectF.l of the boundary pattern RectF of the currently highlighted object, CurSel, and the right side RectN(i).r of the selected object RectN(i) is placed to the right of the right side RectF.r of the boundary pattern RectF of the currently highlighted object, CurSel.

Referring to FIG. 5, the first to third objects satisfying the foregoing conditions are effective, but the fourth and fifth objects are not effective. That is, the fourth object is not effective since the right side RectN4.*r* of the selected object RectN4 is placed to the left of the right side RectF.r of the boundary pattern RectF of the currently highlighted object CurSel. In this case, it does not matter that the left side RectN4.*l* of the selected object RectN4 is placed to the right the left side RectF.l of the boundary pattern RectF of the currently highlighted object CurSel. Further, the fifth object is not effective since the left side RectN5.*l* of the selected object RectN5 is placed to the left of the left side RectF.l of the boundary pattern RectF of the currently highlighted object CurSel.

If the objects biased toward the corresponding direction are determined in operation S118 as described above, a certain reference value for determining one object among the determined objects is obtained at operation S119.

Figure 6:
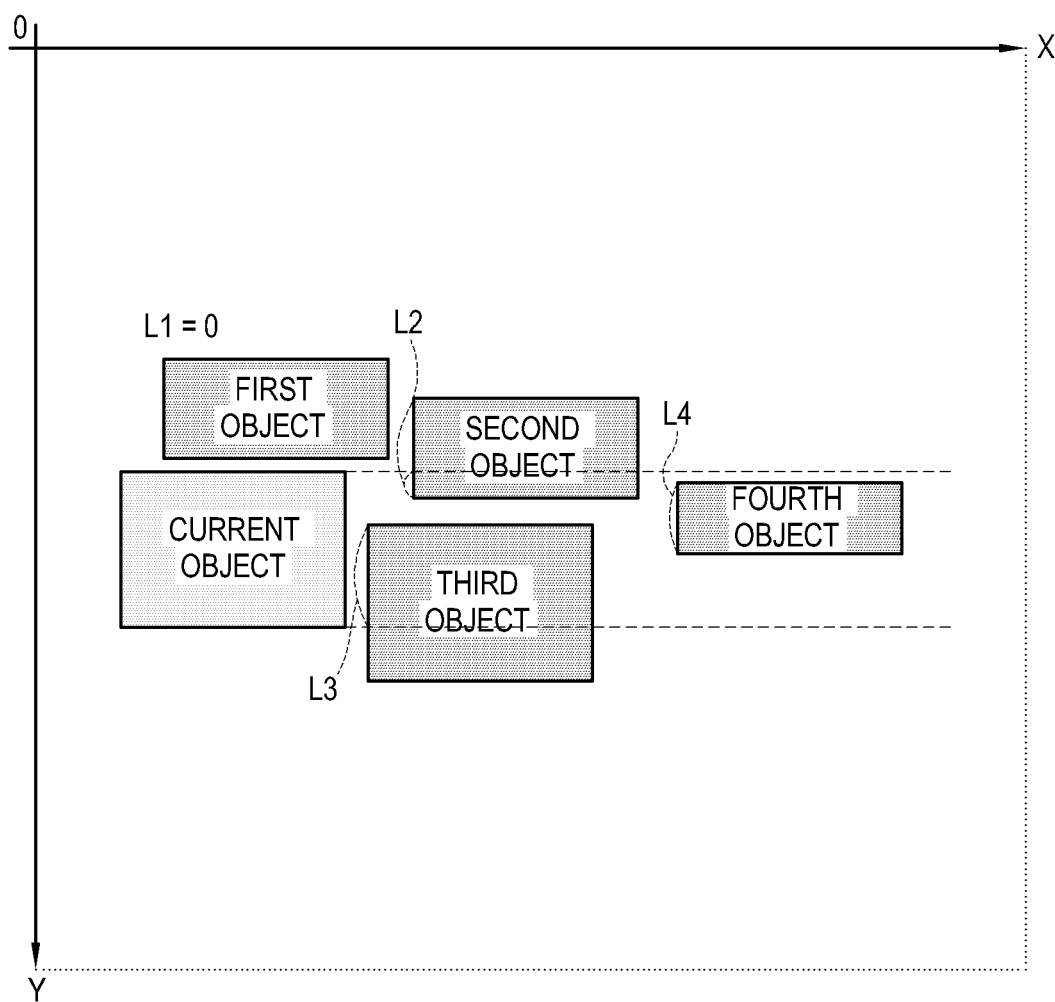

As shown in FIG. 6, one kind of the certain reference values is the lengths L of the first to fourth objects determined in the operation S118, which are overlapped with the object CurSel currently marked with the highlight in the right direction. That is, the length L(i) of the left side RectN(i).l of the target object RectN(i), which is overlapped in the right direction with the left side RectF.l or right side RectF.r of the boundary pattern RectF of the object, CurSel, currently marked with the highlight, is obtained. At this time, the overlapped length L1 of the first object is 0, and the first to fourth objects have the overlapped lengths L2 to L4, respectively.

Figure 7:
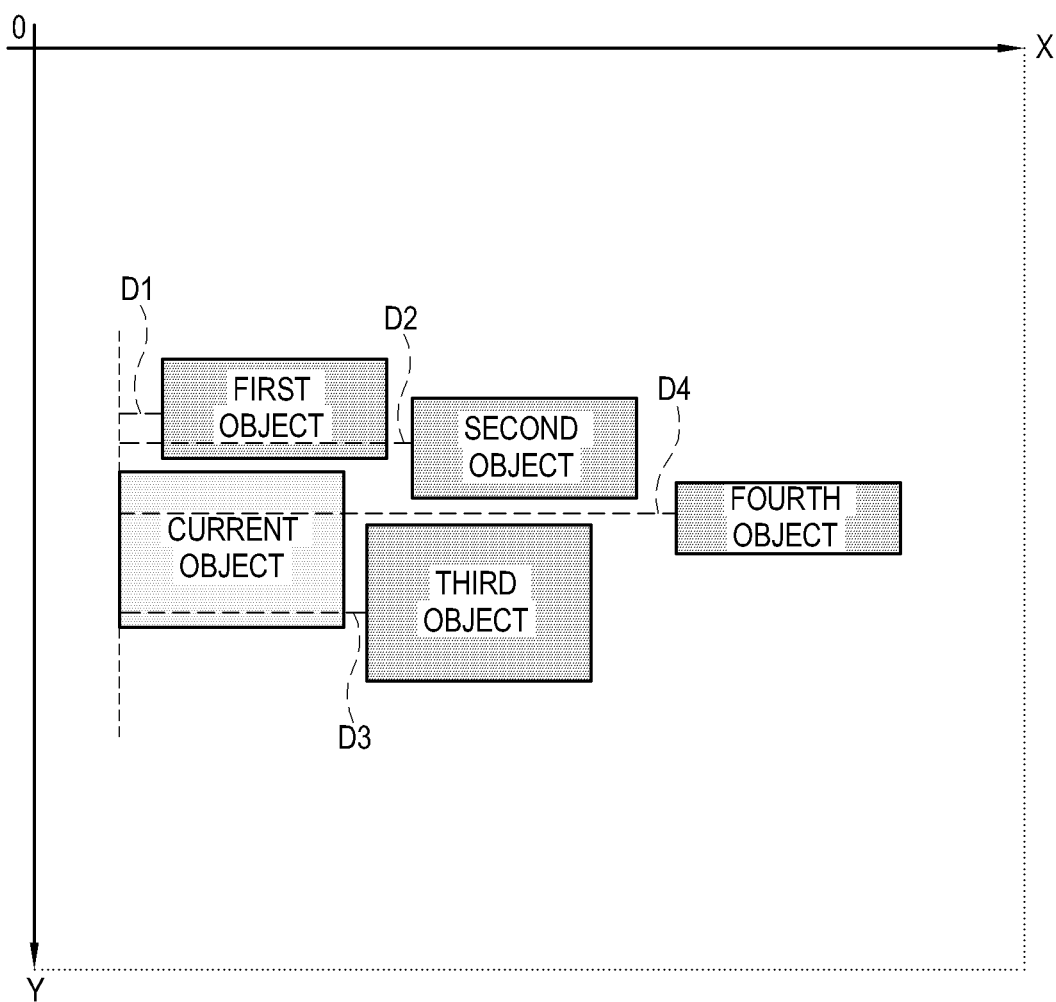

Another kind of the certain reference values is the shortest distance D(i) between an extended line from the left side RectF.l of the boundary pattern, RectF, of the object, CurSel, currently marked with the highlight and the left side RectN(i).l of the target object RectN(i). As shown in FIG. 7, the first to fourth objects have the shortest distances D1 to D4.

Figure 8:
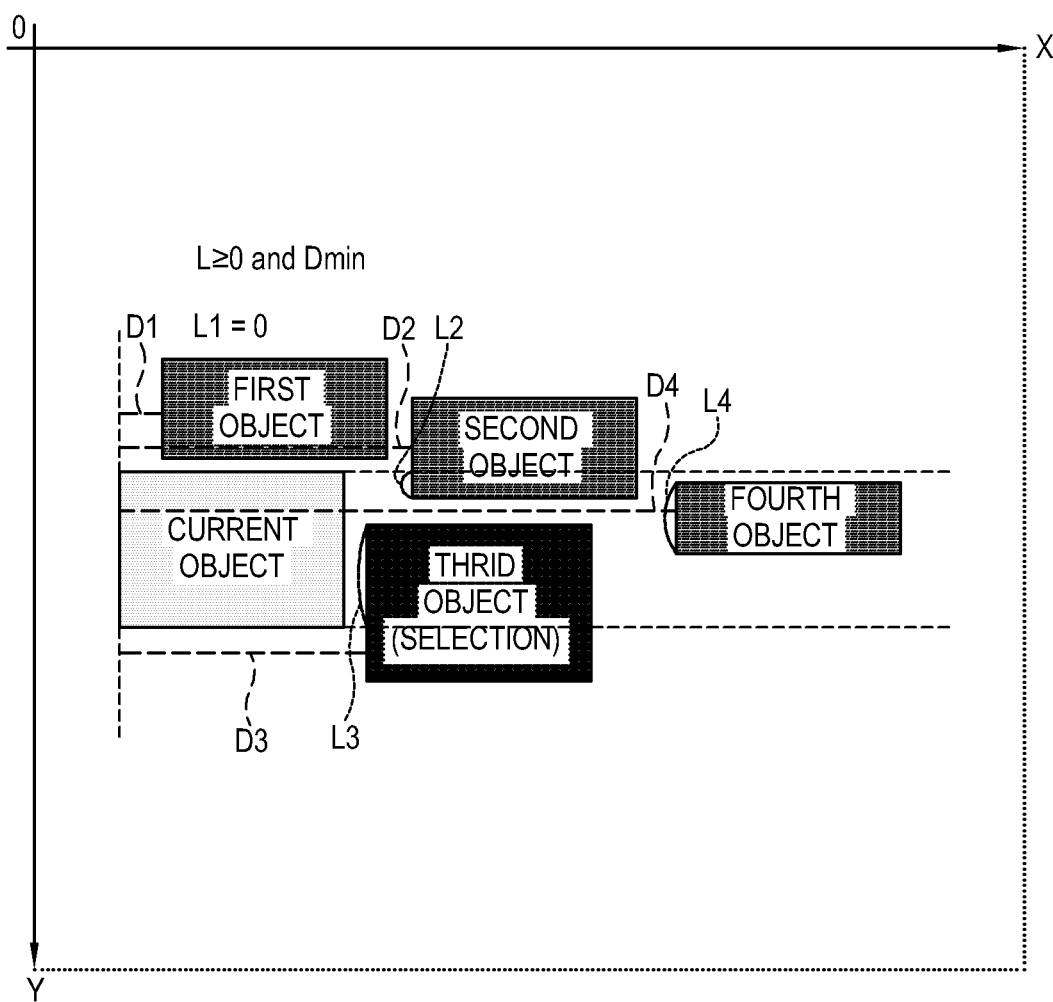

At operation S120, one object in the right direction, which satisfies the following conditions based on two certain reference values, is selected. As shown in FIG. 8, it is possible to select an object (e.g., the third object) having the minimum shortest distance D (e.g., D3<D2<D4) among the objects (e.g., the second to fourth objects) having at least an overlapped length in the right direction (L>0).

Figure 9:
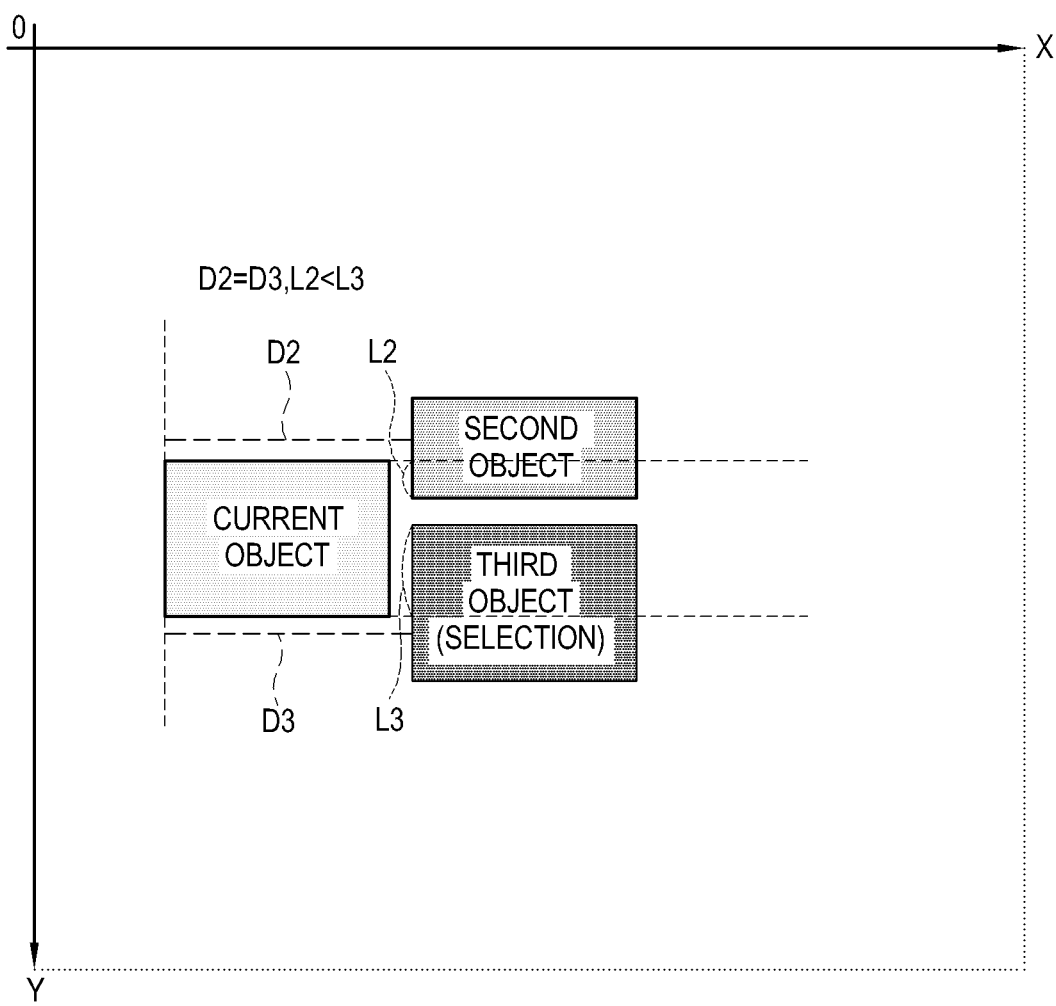

As shown in FIG. 9, if there are objects (e.g., the second and third objects), which have the same shortest distance D (e.g., D2=D3), among the objects having at least the overlapped length (L>0) in the right direction, the object (e.g., the third object) having a longer overlapped length L (e.g., L3>L2) is selected.

Figure 10:
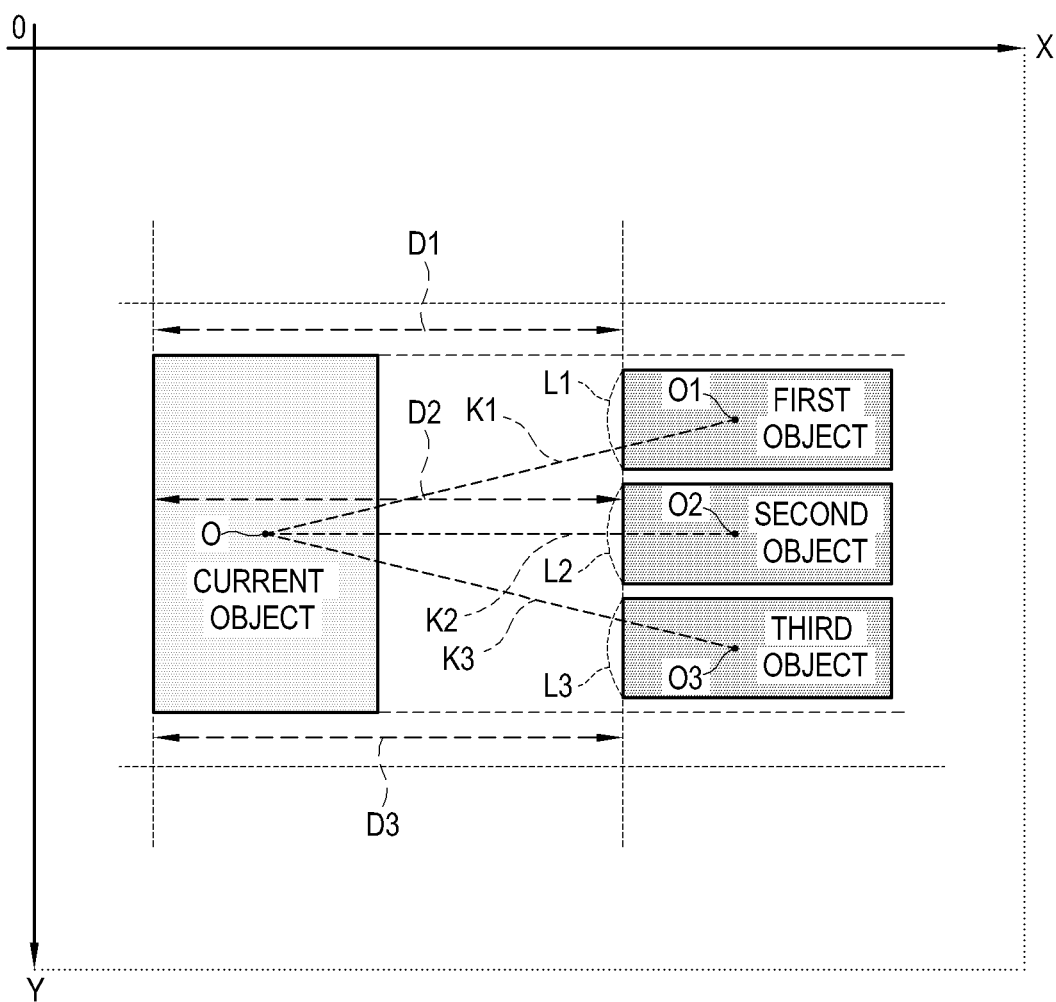

As shown in FIG. 10, if the objects (e.g., the first to third objects) having at least the overlapped length (L>0) in the right direction have the same shortest distance D (e.g., D1=D2=D3) and the same overlapped length L (e.g., L1=L2=L3), distances K1 to K3 from the center O of the boundary pattern RectF of the object CurSel currently marked with the highlight to the centers O1 to O3 of the boundary patterns RectN1 to RectN3 of the first to third objects are obtained at operation S120. That is, the object (e.g., the second object in FIG. 10), which has the minimum distance among the distances K1 to K3 from the center O of the boundary pattern RectF of the object, CurSel, currently marked with the highlight to the centers O1 to O3 of the boundary patterns RectN1 to RectN3 of the first to third objects, is determined as an object to be highlighted.

When one object is determined in the operation S120, the highlight is moved from the currently highlighted object, CurSel, to the determined object (e.g., the third object of FIG. 8 or FIG. 9) at operation S121. The method of moving the highlight between the objects may be achieved by updating the mark of the highlight with regard to the image frame temporarily stored in the storage (e.g., a frame buffer) to be displayed on the display 150 by the controller 130.

Figure 11:
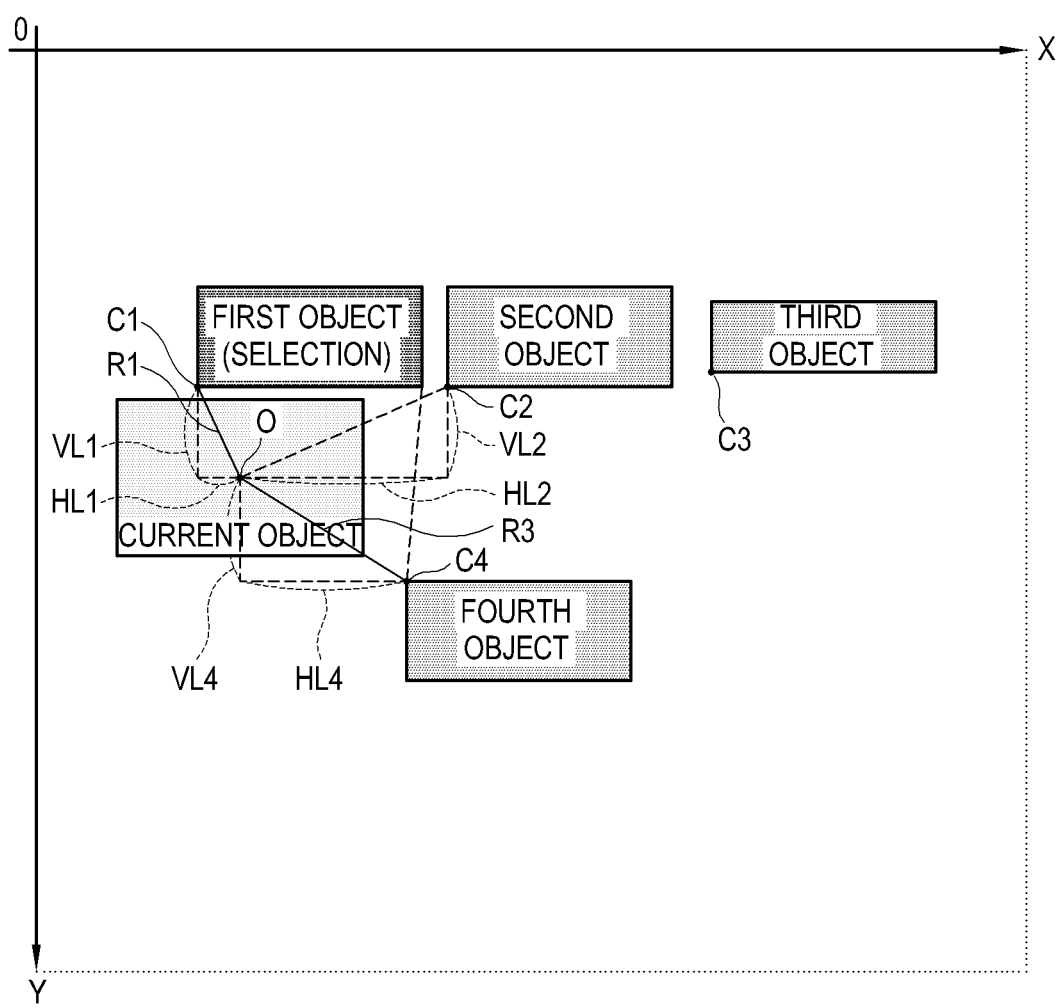

If it is determined in operation S120 that there is no object having at least an overlapped length (L>0) in the right direction, one of other objects (e.g., the first to fourth objects) biased toward the right direction may be selected at operation S122 by the next alternative way. Referring to FIG. 11, the first to fourth objects biased toward the right direction do not have any overlapped length L. At this time, the reference value for selecting the object is obtained as follows.

The closest distance from the center O of RectF to the vertex C(i) of RectN(i) is obtained (this will be called "R")

A horizontal distance HL(i) is obtained by MIN(ABS(RectF.centerx−RectN(i).l), ABS(RectF.centerx−RectN(i).r)).

A vertical distance VL(i) is obtained by MIN(ABS(RectF.centery−RectN(i).t), ABS(RectF.centery−RectN(i).b)).

If the direction is left or right, the vertical length VL(i) is multiplied by a weight W.

A reference value R(i) is obtained by SQRT(VL(i)*VL(i)+HL(i)*HL(i)).

Among the objects (refer to the first to fourth of FIG. 11) biased rightward and having no overlapped length L, an object (e.g., the first object) having the lowest reference value R(i) may be selected.

When one object is selected in the operation S122, the highlight is moved from the currently highlighted object CurSel to the selected object (e.g., the first object of FIG. 11). The method of moving the highlight between the objects may be achieved by updating the mark of the highlight with regard to the image frame temporarily stored in the storage (e.g., a frame buffer) to be displayed on the display 150 by the controller 130.

After applying the foregoing processes to the objects of all the objects, if there is an object that satisfies the first determination standard, this object is selected and returned to the application. If there is an object that satisfies the second determination standard even though it does not satisfies the first determination standard, this object is selected and returned to the application. If the object neither satisfies the first determination standard nor the second determination standard, it is determined that there is no object to be highlighted in the corresponding direction. In other words, it is determined that the object currently marked with the highlight is most biased toward the corresponding direction.

According to an exemplary embodiment, it is easy for an application developer to move the highlight through the arrow keys.

Further, it is possible to rapidly apply the application supporting only the existing pointing input to a device that does not support the pointing input.

In addition, in terms of a device, the method according to an exemplary embodiment is advantageous since all the applications of the corresponding device are consistent in a rule of moving the highlight.

Although exemplary embodiments have been shown and described, it will be appreciated by those skilled in the art that changes may be made in these exemplary embodiments without departing from the principles and spirit of the disclosure. Therefore, the foregoing should be considered as illustrative only. The scope of the invention is defined in the appended claims and their equivalents. Accordingly, all suitable modification and equivalents may fall within the scope of the disclosure.

What is claimed is:
1. A display apparatus comprising:
a display;
a user input unit configured to receive a user input from an external remote controller; and
a processor configured:
to display a screen comprising a plurality of objects having different sizes on the display, to display a selection indicator at a first object of the plurality of objects, based on receiving an arrow key input via the user input unit, to identify a direction of the arrow key input, based on the direction of the arrow key input being identified as a right direction, to select a first target object from among the plurality of objects, the selected first target object being displayed on a right side of the first object in the screen and most overlapping the first object in a vertical range, based on the direction of the arrow key input being identified as an upward direction, to select a second target object from among the plurality of objects, the selected second target object being displayed on a upper side of the first object in the screen and most overlapping the first object in a horizontal range, and to display the selection indicator at the selected first target object or the selected second target object.

2. The display apparatus according to claim 1, wherein the plurality of objects within the screen are bounded by a boundary pattern having a predetermined shape.

3. The display apparatus according to claim 2, wherein the predetermined shape is a rectangle.

4. The display apparatus according to claim 3, wherein the processor is further configured to:

based on a horizontal axis extended from a vertex of a rectangular screen in the right direction being an X-axis and a vertical axis extended in the upward direction being a Y-axis, define the rectangular boundary pattern by a first line parallel to the X-axis extending across a minimum point in a Y-axis direction from the X-axis to an object, a second line parallel to the X-axis extending across a maximum point in the Y-axis direction from the X-axis to the object, a third line parallel to the Y-axis extending across a minimum point in a X-axis direction from the Y-axis to the object, and a fourth line parallel to the Y-axis extending across a maximum point in the X-axis direction from the Y-axis to the object.

5. The display apparatus according to claim 4, wherein the processor is further configured to determine an effective object of the plurality of objects biased toward the direction of the arrow key input according to:

based on the direction being a left direction, the object is the effective object when RectN.r<RectF.r and RectN.l<RectF.l;

based on the direction being the right direction, the object is the effective object when RectF.l<RectN.l and RectF.r<Rect.r;

based on the direction being the upward direction, the object is the effective object when RectN.d<RectF.d and RectN.u<RectF.u; and based on the direction being a down direction, the object is the effective object when RectF.u<RectN.u and RectF.d<Rect.d, wherein RectN.u, RectN.d, RectN.l and RectN.r respectively refer to the up, down, left and right sides of a boundary pattern RectN of a target object Obj, and RectF.u, RectF.d, RectF.l and RectF.r respectively refer to the up, down, left and right sides of a boundary pattern RectF of the first object curSel.

6. The display apparatus according to claim 5, wherein the processor is further configured to display the selection indicator at the target object Obj based on a comparison of a value L and a value D of the target object Obj, wherein the value L is a length of overlapping in a direction between the boundary pattern RectF of the first object curSel and the boundary pattern RectN of the target object Obj, and the value D is a shortest distance between an extended line from one side of the boundary pattern RectF of the first object curSel and a corresponding side of the target object Obj.

7. The display apparatus according to claim 6, wherein the processor is further configured to determine the target object Obj that has at least a nonzero value L and a smallest value D among the plurality of objects is the effective object, based on a result of the comparison.

8. The display apparatus according to claim 7, wherein if there are two or more objects having the smallest value D, the processor is configured to determine that the target object Obj that has a largest value L is the effective object.

9. The display apparatus according to claim 8, wherein if there are two or more objects having the smallest value D and the largest value L, the processor is further configured to determine that the target object Obj that has a minimum distance K from a center of the boundary pattern of the first object to centers of the boundary patterns of the respective target objects is the effective object.

10. The display apparatus according to claim 6, wherein if there is no object overlapped in the direction between the boundary pattern RectF of the first object curSel and the boundary pattern RectN of the target object Obj, the processor is configured to determine that the target object Obj that has a minimum distance R from a center of the boundary pattern of the first object to closest vertexes of the boundary patterns of the respective target objects, among the objects biased toward the direction is the effective object.

11. The display apparatus according to claim 1, wherein, when the arrow key input is input, the processor is further configured to apply the arrow key input to objects of an image frame next to an image frame of the screen displayed on the display.

12. The display apparatus according to claim 11, further comprising a memory configured to store a next image frame.

13. The display apparatus according to claim 2, wherein the arrow key input is received on the boundary pattern of an object, and the arrow key input comprises an input of a highlight moving key.

14. The display apparatus according to claim 1, wherein user interface circuitry comprises at least one of a remote controller, a keyboard, a joystick, and a joy pad.

15. A method of highlighting an object within an image displayed on a display apparatus, the method comprising:

displaying a screen comprising a plurality of objects having different sizes on a display;

displaying a selection indicator at a first object of the plurality of objects;

based on receiving an arrow key input via a user input unit configured to receive a user input from an external remote controller, identifying a direction of the arrow key input;

based on the direction of the arrow key input being identified as a right direction, selecting a first target object from among the plurality of objects, the selected first target object being displayed on a right side of the first object in the screen and most overlapping the first object in a vertical range;

based on the direction of the arrow key input being identified as an upward direction, selecting a second target object from among the plurality of objects, the selected second target object being displayed on a upper side of the first object in the screen and most overlapping the first object in a horizontal range; and displaying the selection indicator at the selected first target object or the selected second target object.

16. The method according to claim 15, wherein the plurality of objects within the screen are bounded by a boundary pattern having a predetermined shape.

17. The method according to claim 16, wherein the predetermined shape is a rectangle.

18. The method according to claim 17, wherein based on a horizontal axis extended from a vertex of a rectangular screen in the right direction being an X-axis and a vertical axis extended in the upward direction being a Y-axis, defining the rectangular boundary pattern by a first line parallel to the X-axis extending across a minimum point in a Y-axis direction from the X-axis to the object, a second line parallel to the X-axis extending across a maximum point in the Y-axis direction from the X-axis to the object, a third line parallel to the Y-axis extending across a minimum point in a X-axis direction from the Y-axis to the object, and a fourth line parallel to the Y-axis extending across a maximum point in the X-axis direction from the Y-axis to the object.

19. The method according to claim 18, further comprising determining an effective object of the plurality of objects biased toward the direction of the arrow key input according to:
based on the direction being a left direction, the object is the effective object when RectN.r<RectF.r and RectN.l<RectF.l;
based on the direction being the right direction, the object is the effective object when RectF.l<RectN.l and RectF.r<Rect.r;
based on the direction being the upward direction, the object is the effective object when RectN.d<RectF.d and RectN.u<RectF.u; and
based on the direction being a down direction, the object is the effective object when RectF.u<RectN.u and RectF.d<Rect.d,
wherein RectN.u, RectN.d, RectN.l and RectN.r respectively refer to the up, down, left and right sides of a boundary pattern RectN of a target object Obi, and RectF.u, RectF.d, RectF.l and RectF.r respectively refer to the up, down, left and right sides of a boundary pattern RectF of the first object curSel.

20. The method according to claim 19, wherein the displaying the selection indicator at the target object Obj is based on a comparison of a value L and a value D of the target object Obj,
wherein the value L is a length of overlapping in a direction between the boundary pattern RectF of the first object curSel and the boundary pattern RectN of the target object Obj, and the value D is a shortest distance between an extended line from one side of the boundary pattern RectF of the first object curSel and a corresponding side of the target object Obj.

21. The method according to claim 20, wherein the determining the effective object comprises determining the target object Obj that has at least a nonzero value L and a smallest value D among the plurality of objects as the effective object.

22. The method according to claim 21, wherein if there are two or more objects having the smallest value D, the determining the effective object comprises determining the target object Obj that has a largest value L, as the effective object.

23. The method according to claim 22, wherein if there are two or more objects having the smallest value D and the largest value L, determining that the target object Obj that has a minimum distance K from a center of the boundary pattern of the first object to centers of the boundary patterns of the respective target objects is the effective object.

24. The method according to claim 20, wherein if there is no object overlapped in between the boundary pattern RectF of the first object curSel and the boundary pattern RectN of the target object Obj, the determining the target object Obj comprises determining that the target object Obj that has a minimum distance R from a center of the boundary pattern of the first object to closest vertexes of the boundary patterns of the respective target objects, among the objects biased toward the direction is the effective object.

25. The method according to claim 15, wherein when the arrow key input is input, the method further comprises applying the arrow key input to objects of an image frame next to an image frame of the screen displayed on the screen.

26. The method according to claim 25, further comprising storing a next image frame.

27. The method according to claim 16, wherein the arrow key input is received on the boundary pattern of the object, and the arrow key input comprises an input of a highlight moving key.

28. The method according to claim 15, wherein the arrow key input is received through at least one of a remote controller, a keyboard, a joystick, and a joy pad.

29. The display apparatus according to claim 1, wherein the first target object or the second target object is selected further based on having a smallest distance from the first object among the plurality of objects having the different sizes.

* * * * *